United States Patent [19]

Nojiri et al.

[11] 4,397,797
[45] Aug. 9, 1983

[54] METHOD FOR EXTRUSION COATING OF A PIPE WITH A FOAMED COVER LAYER HAVING THREE INTEGRALLY FORMED CELLULAR SUB-LAYERS

[75] Inventors: Akio Nojiri, Yokohama; Toshio Koreeda, Tokyo; Masao Horiguch, Nishinomiya, all of Japan

[73] Assignees: The Furukawa Electric Co., Ltd.; Furukawa Metals Co., Ltd., both of Tokyo, Japan

[21] Appl. No.: 172,422

[22] Filed: Jul. 25, 1980

[30] Foreign Application Priority Data

Jul. 31, 1979 [JP] Japan .................................... 54-97516

[51] Int. Cl.³ .......................... B29D 27/00; B29F 3/10
[52] U.S. Cl. .................................. 264/45.5; 264/45.9; 264/46.1; 264/173; 425/113; 425/817 C
[58] Field of Search ......................... 264/45.9, 46.1, 54, 264/45.5, 173; 425/113, 817 C

[56] References Cited

U.S. PATENT DOCUMENTS

| | | | |
|---|---|---|---|
| 3,528,458 | 9/1970 | Gaeckel | 264/45.9 X |
| 3,649,730 | 3/1972 | Benteler et al. | 264/54 X |
| 4,130,976 | 12/1978 | Kesseler et al. | 264/46.1 X |
| 4,146,562 | 3/1979 | Fukusaima et al. | 264/45.9 X |

FOREIGN PATENT DOCUMENTS

| | | | |
|---|---|---|---|
| 2420608 | 11/1975 | Fed. Rep. of Germany | 264/45.9 |
| 2033555 | 11/1970 | France | 264/45.9 |
| 48-4869 | 2/1973 | Japan | 264/45.9 |
| 48-24822 | 7/1973 | Japan | 264/46.1 |
| 1217729 | 12/1970 | United Kingdom | 264/46.1 |

*Primary Examiner*—Philip E. Anderson
*Attorney, Agent, or Firm*—Frishauf, Holtz, Goodman & Woodward

[57] ABSTRACT

A method for manufacturing a heat insulating pipe having a foamed insulating layer around the outer surface of said pipe. The foamed insulating layer has an expansion ratio of at least 4. It has three integral sub-layers, said sub-layers including a cellular middle foamed sub-layer which is integral with a cellular inner foamed sub-layer and a cellular outer foamed sub-layer, said inner and outer sub-layer being on opposite sides of said middle sub-layer, said cellular inner foamed sub-layer being the innermost sub-layer with respect to said pipe and surrounding the outer surface of said pipe. The cells of said inner and outer sub-layers are smaller than the cells of said middle cellular sub-layer, the ratio $\mu_1/\mu_2$ of the cell dimensions of said cellular middle sub-layer are between 0.3 and 0.9, wherein $\mu_1$ is the average cell dimension measured in the radial direction of said pipe and $\mu_2$ is the average cell dimension measured in the axial direction of said pipe. The method for producing said 3 sub-layered foamed insulating layer comprises passing a pipe heated to a temperature of between 60° C. and 120° C. through the nipple of a cross-head die and simultaneously extruding a mixture of a propylene-ethylene block polymer having an ethylene content of between 1 and 20% by weight and a Melt Index of between 0.1 and 4 together with a foaming agent over the outer surface of said pipe to cause said mixture to expand and form said 3 sub-layered foamed insulating layer on said pipe, the relationship between the overall thickness t of the 3 sub-layered foamed insulating layer, the expansion ratio M of the 3 sub-layered foamed insulating layer, and the die-nipple distance d of a cross-head die being $$d = K \frac{t}{\sqrt[3]{M}}$$

wherein K=0.75 to 0.20.

10 Claims, 4 Drawing Figures

METHOD FOR EXTRUSION COATING OF A PIPE WITH A FOAMED COVER LAYER HAVING THREE INTEGRALLY FORMED CELLULAR SUB-LAYERS

The present invention relates to a heat insulating pipe having a heat insulating foamed layer consisting of a foamed plastic and more particularly to a heat insulating metal pipe or a heat insulating plastic pipe with a highly foamed polyolefin layer.

As hot-water supply and heating systems have become more popular, heat insulating metal pipes have been conventionally widely used which have heat insulating layers of foamed polyolefin having an expansion ratio of about 2. However, for the sake of energy conservation, heat insulating pipes with improved heat insulation, resistance to compression, and resistance to buckling and with less water absorbency have been desired. Further, when pipes are used for hot-water supply or heating by circulating heated water, they must be heat resistant. The low expansion ratio polyethylene heat insulating layers of the type described above have been defective in heat insulation and heat resistance. Although it is possible to cover a metal pipe with a crosslinked and highly foamed polyethylene sheet or with a highly foamed polypropylene sheet, it requires a complex procedure to continuously coat the sheet around the outer circumference of the pipe and adhesion between the pipe and the covering layer is not good so that the resultant pipe is defective in resistance to compression and resistance to buckling. Further, pipes with a heat insulating layer of foamed polyethylene having an expansion ratio of five have been proposed by the extrusion foaming method. However, with such pipes, the heat insulation only is somewhat improved. Still worse, due to the high expansion ratio, open cells are produced, greatly decreasing the resistance to compression and increasing the water absorbency. Thus, this method has also failed to provide a practical solution to the problem. When such heat insulating pipes are used for high temperature hot-water or steam, the heat insulating layers made of polyethylene shrink due to its inherent low heat resistance. These pipes are thus unusable at high temperatures. Further, their strength and resistance to water tend to degrade as heat insulation was further improved by raising the expansion ratio. Thus, pipes satisfying these two different categories of characteristics have not been provided.

In order to eliminate these problems of the prior art, the present invention provides, as a result of extended research on cell structures and various properties, a heat insulating pipe with improved heat insulation, resistance to compression, and heat resistance and with less water absorbency. Thus, in accordance with the present invention, a heat insulating pipe having a foamed insulating layer covering the outer circumferential face of a pipe is provided which is characterized in that said heat insulating layer is of a three-layered structure comprising a middle foamed layer with relatively large cells and a lower foamed layer and an upper foamed layer with relatively small cells located at both sides of said middle layer, the ratio $\mu_1/\mu_2$ of the cell diameters of said middle foamed layer being 0.3–0.9 where $\mu_1$ is the average cell diameter measured in the radial direction of said pipe and $\mu_2$ is the average cell diameter as measured in the axial direction of said pipe.

The value of $\mu_1$ is generally 0.2–1.0 mm and that of $\mu_2$ is generally 0.22–3.0 mm.

The average cell diameter as radially measured of the middle foamed layer is 0.2–1.0 mm and that of the lower and the upper foamed layers is below 0.2 mm. The thickness of the middle foamed layer comprises 40–90% of the total thickness of the foamed layers. The lower and the upper foamed layers are of substantially the same thickness.

The total expansion ratio is over 4. The expansion ratio of the middle foamed layer is over 5 and the expansion ratios of the lower and the upper layers are lower than that of the middle foamed layer.

This invention can be more fully understood from the following detailed description when taken in conjunction with the accompanying drawing, in which.

Figure 1:
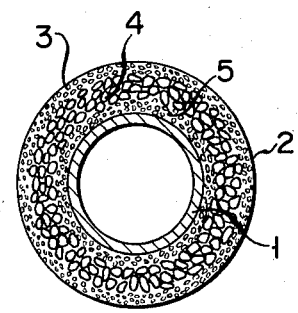
FIG. 1 is a sectional view of a heat insulating pipe of the present invention as cut in the direction perpendicular to the axial direction of the pipe.
Figure 2:
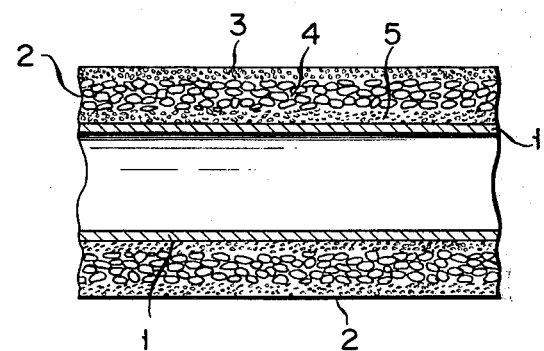
FIG. 2 is a sectional view of the heat insulating pipe of the present invention, as cut with a plane containing the central axis of the pipe.

The structure of the heat insulating pipe will now be described referring to FIGS. 1 and 2 wherein numeral 1 denotes a coated pipe and 2 denotes a heat insulating layer. The heat insulating layer, as may be seen from FIGS. 1 and 2, has a three-layered structure. Numeral 3 denotes an upper foamed layer; 4, a middle foamed layer; and 5, a lower foamed layer. The cells in the middle foamed layer are large, and the cells in the upper and lower foamed layers are small. In the middle foamed layer 4 of FIG. 2, the average cell diameter $\mu_1$ in the radial direction is shown to be smaller than the average cell diameter $\mu_2$ in the axial direction.

With this structure, cell diameter, and expansion ratio, the heat insulating layer having closed cell adheres well to the pipe body. The resistance to compression and resistance to buckling are improved, and the water absorbency is smaller.

This may be explained as follows. Since the upper and lower foamed layers have dense small cells which are completely closed cells and are strong, the layers are water-tight and the water absorbency is small. Further, the small cell layer adhered to the pipe acts as a protective layer against buckling caused when a great deforming force is locally exerted on the pipe, thus providing a heat insulating layer which has resistance to buckling. The cell walls of the middle foamed layer are thick and resistant to compression. The object of the present invention is achieved only with the above structure.

When a load is exerted on a conventional highly foamed heat insulation copper pipe, the copper pipe easily deforms. However, the heat insulating pipe of the structure of the present invention is excellent in resistance to compression and will not excessively deform. Furthermore, since the heat insulating layer of a conventional heat insulating pipe is a foamed body having open cells, water absorbency is great, resulting in corrosion of the metal of the copper pipe. Absorption of water also results in degradation of heat insulation.

A method for manufacturing heat insulating pipes of the structure described above should be conducted in such a way that in extrusion coating of a pipe with a polypropylene resin foamed heat insulating layer, the relations $$d = K \frac{t}{\sqrt[3]{M}} \quad (1)$$

$$K = 0.75-0.20 \quad (2)$$

can be satisfied between the thickness t of the foamed heat insulating layer, the expansion ratio M, and the die-nipple distance d mm.

In formula (1), when K is below 0.20, irregular flow of resin is caused so that heat insulating layers of uniform thickness may not be obtained. When this value exceeds 0.75, the heat insulating layer becomes too thick so that correct dimensioning may become impossible. If the take-off speed is increased in order to forcibly obtain correct dimensioning, the cells of the resultant heat insulating layers may be interconnected and become open. The water absorbency then increases. With the die-nipple distance of the present invention, it is possible to obtain a heat insulating layer of three-layered structure and of a desired expansion ratio which satisfies the condition $\mu_1/\mu_2=0.3-0.9$. A more preferable range for K is 0.3–0.4 when the expansion ratio is 4–8.

The foamable polymer used in the present invention are polypropylene resins. The preferred resin is a propylene-ethylene copolymer which contains 1–20% of ethylene and has an MI (melt index) of 0.1–4, and preferably contains 7–20% of ethylene and has an MI of 0.1–2. The above-mentioned resin may be used alone or it may be mixed with one or more other miscible polymers or rubber in an amount of less than 40% by weight.

In order to improve resistance to buckling, it is possible to use a mixture of the above-mentioned polymer with one or more of the following: an ethylene-propylene rubber (EPR), polyethylene, an ethylene-vinylacetate copolymer, and polybutene-1. If the amount of the latter polymer exceeds 40% by weight, the foaming becomes unstable and the heat resistance is degraded, providing unsatisfactory results.

Among the above-mentioned polymers to be added, an EPR containing 20–60% ethylene is most preferred. A heat insulating copper pipe coated with a polypropylene-EPR foamed layer may not cause buckling of the coating layer when the pipe is bent at a small radius of curvature.

The above-mentioned propylene-ethylene copolymer is high in elasticity and the change in elasticity is modest in the molten condition so that foamed bodies of good quality can be obtained over a wide temperature range. Thus, the heat insulating foamed layer of three-layered structure may be easily obtained by extrusion foaming. The reason why a foamed body of such good quality is obtained is considered to be attributable to the pseudocrosslinking effects of the above-mentioned copolymer. Since a crosslinked polymer has generally a high elasticity and small temperature dependency under the molten condition, it is suitable for foaming. The above-mentioned propylene-ethylene copolymer which has never experienced a crosslinking treatment is extracted in tetralin (135° C.), a suitable solvent for polypropylene, for 6 hours. The copolymer contains 10–40% undissolved material and exhibits pseudocrosslinking, which is thought to cause significantly good foamability. This copolymer is especially preferably used in the powder form product of the polymerizing process. This is because, if the copolymer is provided with more thermal history, the fine structure of the polymer molecules changes and the pseudocrosslinked structure decreases. A propylene-ethylene copolymer containing 1–20% of ethylene and having an MI of 0.1–4 has a gel content as great as 10–40%, and a dynamic shear modulus G' measured by a dynamic viscoelasticity at 170° C. and 100 Hz in a range as high as $1.5 \times 10^6 < G' < 10 \times 10^6$. Its temperature change is small so that it is suitable for foaming.

According to the foaming method of the present invention, to polypropylene or to a mixture including polypropylene are added a solid foaming agent such as sodium bicarbonate, ammonium bicarbonate, dinitrosopentamethylenetetramine, azodicarbonamide, and pp'-oxybisbenzenesulfonylhydrazide, together with, if necessary, a urea compound, a metal oxide, and a metal salt of fatty acid foaming assistant. The obtained mixture is extrusion foamed over the outer circumferential face of the copper pipe or the like.

In order to obtain the highly foamed three-layered polypropylene resin heat insulating layers with stability, the decomposition temperature of the foaming agent must be noted. The preferable decomposition temperature of the foaming agent is 120°–170° C., and more preferably 130°–160° C. The decomposition temperature is preferably obtained by adding a foaming assistant to azodicarbonamide or dinitrosopentamethylenetetramine alone or to a mixture thereof. A volatile foaming agent, for example of a lower aliphatic hydrocarbon such as propane, butane and pentane; a halogenated hydrocarbon such as monochlorodifluoromethane, dichlorodifluoromethane, trichlorotrifluoromethane, monochlorotrifluoromethane, or dichlorotetrafluoroethane; and a gas which is in the gas phase under normal conditions, such as nitrogen, carbon dioxide gas, oxygen, air, or argon gas are mixed under pressure into the above-mentioned copolymer or into a mixture thereof in an extruder for extrusion foaming of the mixture over the outer surface of a copper pipe or the like. The method for mixing the polymer under pressure with the gas or the volatile foaming agent may involve feeding under pressure through a vent hole formed in the cylinder of the extruder, feeding under pressure from the hopper, or feeding under pressure at the screw part.

In the method of the present invention, for extrusion foaming to coat the above-mentioned polymer or a mixture thereof over a metal pipe or a plastic pipe, the pipe is continuously supplied to the nipple part by a crosshead die or an offset die mounted in the extruder. The front end of the nipple is easily deprived of heat by the metal pipe passing therethrough. When the temperature of the front end of the nipple is below 100° C., the flowability of the melt resin is lowered and it becomes impossible to supply the melt resin. Consequently, it is required to heat the front end of the nipple or the metal pipe while supplying it. The metal pipe is heated, for example, to a surface temperature of 60°–120° C. When this temperature is below 60° C., a foamed heat insulating layer of uniform thickness may be obtained. Further, as a nonfoamed skin layer appears in place of the lower foamed layer, the highly foamed three-layered structure with small cell layers and a large cell layer, which is the object of the present invention, is not obtainable. When this temperature exceeds 120° C., the adhesion of the layer to the pipe is lower.

In the method of the present invention, the shape of the die used is generally circular correspnding to that of the pipe. However, in order to obtain a foamed layer of different sectional shape such as elliptical and rectangular, the die shape is changed. The foamed layer extruded from the die and coated over the outer circumferential surface of the pipe must be cooled as close to the die as possible. However, the die must not be cooled. For this purpose, the foamed layer thus extruded on the pipe is forcibly cooled from a place 2 cm away from the die orifice and beyond for uniform cooling by air or water. The temperature of the cooling medium is preferably below 50° C. When it exceeds this limit, the small cell surface layer is not obtainable which is the original purpose of the cooling.

Cooling is preferably performed in two separate stages. In the first stage, the coated pipe is cooled at the surface immediately after passing the die while not cooling the die so as to obtain a small cell surface layer. The second cooling is the substantial cooling for regulating the outer shape, expansion ratio, and the cell shapes of the middle layer.

Figure 3:
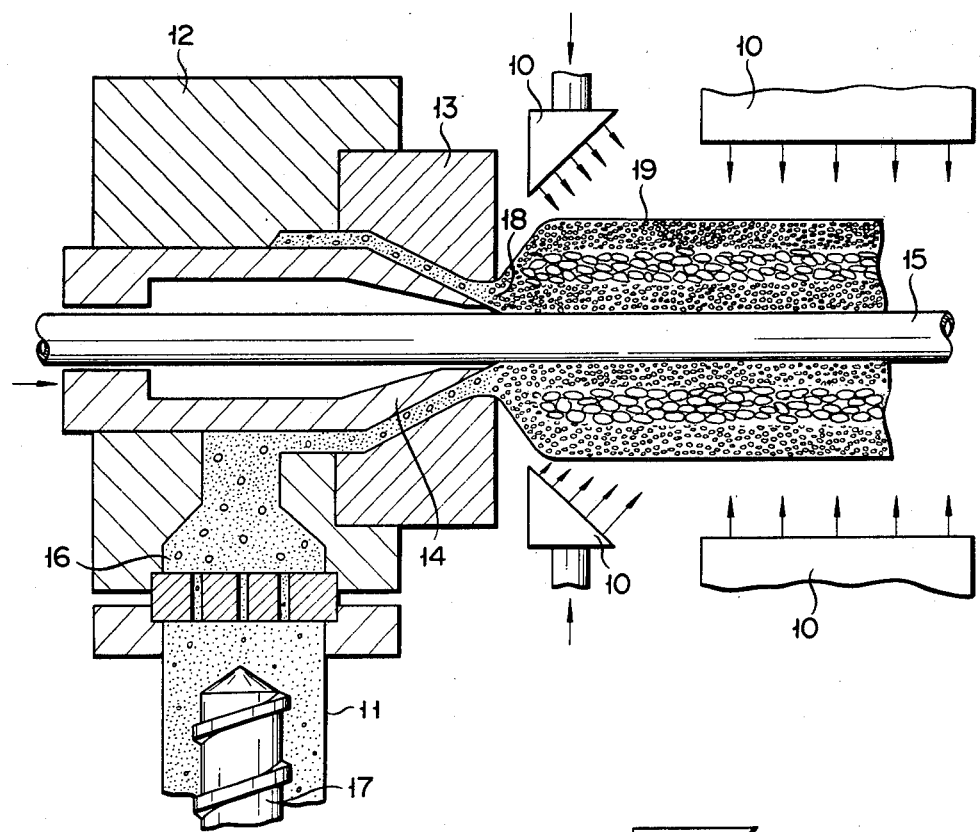
FIG. 3 is a schematic cross-sectional view of the extrusion means and process.

FIG. 3 schematically shows the construction of the cross head die mounted to the tip portion of an extruder 11 and the arrangement of a cooling device 10. It is seen that a cross head portion 12 is jointed to the extruder 11. Also, a die 13 and a nipple 14 are jointed to the cross head portion 12. A pipe 15, e.g., copper pipe, is supplied through the nipple 14 in the direction denoted by an arrow. Polyolefin 16 containing a foaming agent is pushed by a screw 17 of the extruder 11 through the cross head portion so as to be extruded from a die orifice 18 defined between the die 13 and the nipple 14. The foamable polyolefin 16 is foamed after extruded from the die orifice 18, with the result that the pipe 15 is covered with a polyolefin foam 19.

Figure 4:
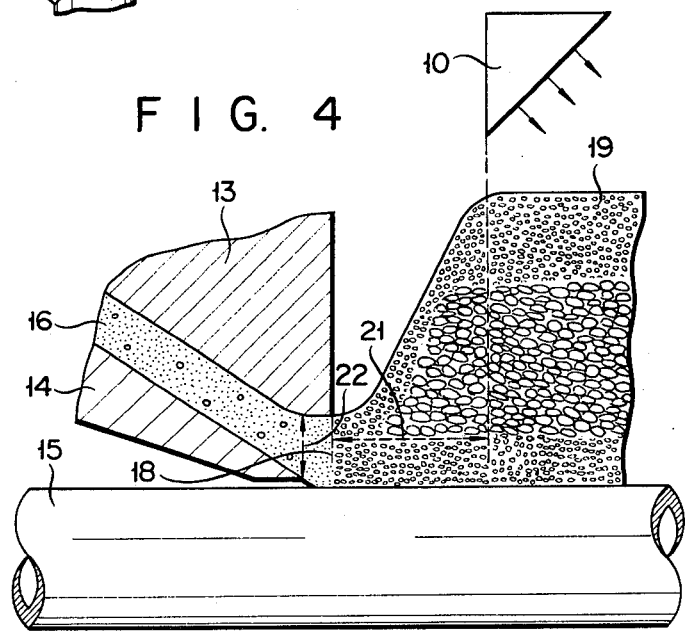
FIG. 4 is a magnified portion of a portion of FIG. 3.

FIG. 4 shows in a magnified fashion the portion where the foamable polyolefin 16 extruded from the die orifice 18 is foamed and covers the pipe 15. The foamed polyolefin is cooled by the cooling device 10. The foam begins to be cooled by the cooling device 10 at a distance 21 from the die orifice 18. Reference numeral 22, i.e., "d" denotes the downstream distance between the die 13 and the nipple 14.

A sizing die of metal or resin may be used for correctly maintaining the required outer shape of the coated pipe. The dimension of the sizing die is preferably by 0.1-1 mm smaller than the desired outer diameter of the desired heat insulating pipe. The length of the sizing die is generally below 30 cm and preferably 5-15 cm.

The distance between the die and the sizing die is generally 40-200 cm, and preferably 80-150 cm.

With a foamed polypropylene insulation copper pipe, degradation of the polypropylene foamed layer may be generated by accelerated oxidation due to copper ions. Further, discoloration and corrosion of the foamed layer may be generated by reaction of the copper pipe with the foamed polypropylene. For these reasons, it is recommended that the copper pipe be coated with resin.

Although many coating methods are known, coating with an extruder, coating by immersion, and powder coating and so on are easy. The coating resin may be a thermoplastic resin such as polyethylene, nylon, or polyvinyl chloride; or a thermosetting resin such as unsaturated polyester, polyurethane, epoxy resin or the like. Among these, water soluble acrylic resin, polyester resin, polyurethane resin and so on are preferable. The resin is attached to the copper pipe by some suitable method and coated to a thickness of 0.1-50 $\mu$m by baking.

Although the heat insulating pipe of the present invention may be used as it is, it is preferable to provide a plastic sheath over the foamed layer. The sheath is formed by applying over the cooled heat insulating layer soft polyvinyl chloride, polyethylene, chlorinated polyethylene, ethylene-vinylacetate copolymer or the like, or by applying such a resin mixed with an inorganic filler, a fire retardant, an ultraviolet absorber, carbon black, an antioxidant or the like, The present invention will now be described with reference to its examples and comparative examples.

Example 1 and Comparative Examples 1-3

An azodicarbonamide-based foaming agent (decomposition temperature 167° C.) containing 2% by weight of zinc oxide as foaming assistant was added in the amount of 2.5 phr (parts per hundred parts of resin) to propylene-ethylene block copolymer powder (MI=0.8, with a 14% ethylene content, and 163° C. melting point (mp). The mixture was extruded with an extruder of 65 mm in screw diameter while supplying a copper pipe (70° C. copper pipe temperature) of 9.5 mm in diameter to the crosshead die for extruding, thereby coating the mixture over the outer face of the copper pipe. The heat insulating pipe with the heat insulating layer of the structure indicated below was obtained.

The ratio of $\mu_1/\mu_2$ is 0.8.

The degree of water absorption and the thermal loss were measured with this heat insulating pipe and the results obtained are shown in Table 1.

Further, for the purpose of comparison, the degree of water absorption and the thermal loss were measured in a similar manner for a conventional heat insulating pipe (Comparative Example 3), that is, a heat insulating pipe having a foamed heat insulating layer of a single-layered structure, and heat insulating pipes (Comparative Examples 1 and 2) having foamed heat insulating layers of two-layered structure. The results obtained are shown in Table 1.

TABLE 1

|  | Heat insulating pipe of present invention | Heat insulating pipe of Comparative Example 1 | Heat insulating pipe of Comparative Example 2 | Heat insulating pipe of Comparative Example 3 |
| --- | --- | --- | --- | --- |
| Copper pipe size | 9.53 mm | 9.53 mm | 9.53 mm | 9.53 mm |
| Cell structure of heat insulating layer | Three-layered | Two-layered | Two-layered | Single-layered |
| Thickness of heat insulating layer |  |  |  |  |
| Upper foamed layer | 1 mm | 2 mm | 2 mm | — |
| Middle foamed layer | 2 mm | — | — | — |

TABLE 1-continued

|  | Heat insulating pipe of present invention | Heat insulating pipe of Comparative Example 1 | Heat insulating pipe of Comparative Example 2 | Heat insulating pipe of Comparative Example 3 |
| --- | --- | --- | --- | --- |
| Lower foamed layer Cell diameter of heat insulating layer | 1 mm | 2 mm | 2 mm | 4 mm |
| Upper foamed layer | 0.18 mm | 0.74 mm | 0.20 mm | — |
| Middle foamed layer | 0.67 mm ($\mu_1/\mu_2$ 0.80) | — | — | — |
| Lower foamed layer | 0.18 mm | 0.20 mm | 0.66 mm | 0.78 mm |
| Expansion ratio | 5.3 | 5.3 | 5.4 | 5.6 |
| Water absorbency | 2.5% | 7.3% | 5.2% | 8.1% |
| Thermal loss | 18 kcal/m · hr | 25 kcal/m · hr | 21 kcal/m · hr | 27 kcal/m · hr |

Here, the lower foamed layer means the layer which is in direct contact with the copper pipe. The upper layer means the outermost foamed layer. The thermal loss is the number of calories lost by the pipe for a length of 1 m during 1 hour when water heated to a temperature of 80° C. is circulated therein at an ambient temperature of 20° C. The thermal loss is expressed in units of kcal/m.hr.

As may be apparent from the above table, with the heat insulating pipe of the present invention, water absorption and thermal loss were small, and the deformation in a cross-section of the copper pipe was advantageously small by bending.

The heat insulating pipes of the Comparative Examples showed great water absorption and thermal loss and they were proved to be defective as heat insulating pipes.

Example 2

The same mixture of propylene-ethylene block copolymer and the foaming agent, as used in Example 1 was used for extrusion foaming over the outer circumferential face of a copper pipe of the same type. The die used was of the circular type. The distance between the die and the nipple was 0.7 mm, resin temperature was 175° C., and the dynamic shear modulus G' was $3 \times 10^6$ dyne/cm$^2$. The front temperature of the nipple was 155° C. Th extruded pipe which was coated with the above mixture was cooled by air supplied by a blower at a place 5 cm away from the die. Immediately after forming by the sizing die, the coated pipe was cooled by water at a place 90 cm away from the die. With the heat insulating layer of the heat insulating pipe thus obtained, the thickness of the middle foamed layer was 1.7 mm (average cell diameter 0.6 mm), the thickness of the upper foamed layer was 0.8 mm (average cell diameter 0.15 mm), and the thickness of the lower foamed layer was 0.7 mm (average cell diameter 0.15 mm). These layers had a three-layered structure with less water absorbency, $\mu_1/\mu_2 = 0.60$ and the average expansion ratio was 6.2 where K was 0.40.

Example 3

The mixture of the polymer and the foaming agent used as in Example 1, was melted and plasticized at a temperature of 190° C. through an extruder with a vent hole of 65 mm in screw diameter. Dichlorodifluoromethane was injected into the vent hole at the rate of 48 cc per minute using a pump. A copper pipe of 15.88 mm in diameter (60° C. copper pipe temperature) was supplied to the crosshead die (148° C. resin temperature) while maintaining the nipple at a temperature of over 128° C. The mixture was thus extruded to be coated over the outer circumferential face of the pipe. The die used was of the circular type. The distance between the die and the nipple die was 0.85 mm. The surface of the coated pipe was cooled with cool air at a point 3 cm away from the die and beyond. The average expansion ratio of the heat insulating foamed layer of the obtained copper pipe was 22. The thickness of the foamed layer was 7 mm (the upper layer 1 mm, the middle layer 5 mm, and the lower layer 1 mm) and $\mu_1/\mu_2 = 0.68$ where $\mu_1$ was 0.88 mm and $\mu_2$ was 1.18 mm. The obtained heat insulating pipe had a heat insulating layer of three-layered structure with less water absorbency, improved heat insulation, resistance to compression and resistance to buckling. The average diameter of the cells in the upper and lower layers was 0.18 mm. K was 0.34.

Example 4

The mixture was prepared by mixing 80% by weight of propylene-ethylene block copolymer powder (MI=0.8, with 13% ethylene content and mp=164° C.), 20% by weight of ethylene-propylene rubber (containing 26% propylene), and 1.5 phr of talc. The mixture was extrusion foamed over the outer circumferential face of the copper pipe using the die as in Example 1 while injecting nitrogen gas into the vent portion of the vented type 65 mm screw diameter extruder under a pressure of 35 kg/cm$^2$ and supplying the copper pipe (70° C.) at a nipple temperature of over 130° C. The die used was of the circular type and the resin temperature was 172° C. The distance between the die and the nipple was 0.8 mm. G'=$2.8 \times 10^6$ dyne/cm$^2$. The coated pipe thus extruded from the die was showered with water (20° C.) at a place 3 cm away from the die and beyond. Thereafter a polyvinyl chloride sheath was further coated thereover.

The average expansion ratio of the heat insulating foamed layer was about 7. The thickness of the foamed layer was 5 mm; it was of three-layered structure with the middle foamed layer (3.0 mm in thickness), the upper foamed layer (1.2 mm in thickness), and the lower foamed layer (0.8 mm in thickness). $\mu_1 = 0.40$ mm, $\mu_2 = 0.44$ mm and $\mu_1/\mu_2 = 0.90$ in the middle foamed layer. K was 0.3. The pipe had less water absorbency and better heat insulation, and was resistant to compression. When a load of 150 kg was exerted on it, the pipe was not flattened but remained circular. When the heat insulating pipe was bent through 90 degrees at a radius of curvature of 100 mm, it did not exhibit buckling.

Examples 5 and 6, and Comparative Example 4

The coated pipe extruded from the die as in Example 3 was forcibly taken off at an accelerated take-off speed so as to obtain various cell structures. The water absorbency of these heat insulating pipes was measured.

The results obtained are shown in Table 2.

TABLE 2

| Thickness of upper-middle-lower layers (mm) | Cell diameter in radial direction $\mu_1$ | Cell diameter in axial direction $\mu_2$ | $\mu_1/\mu_2$ | Water absorbency |
|---|---|---|---|---|
| Example 5: 1.0-5.0-1.0 | 0.72 mm | 1.06 mm | 0.68 | 2% |
| Example 6: 0.8-4.5-0.7 | 0.54 mm | 1.32 mm | 0.41 | 5% |
| Comparative Example 4: 0.7-3.8-0.7 | 0.41 mm | 1.86 mm | 0.22 | 23% |

As may be apparent from the above table, when the ratio of $\mu_1/\mu_2$ is without the range of 0.3–0.9, the water absorbency increases greatly and the heat insulation is extremely degraded even with the three-layered heat insulating layer.

Example 7 and Comparative Example 5

Comparisons were made of a heat insulating copper pipe having a heat insulating layer with $\mu_1/\mu_2=0.65$, a three-layered structure, and an expansion ratio of 5 which was prepared by extrusion of a mixture of 80% of a propylene-ethylene block copolymer (MI 0.8, ethylene content 13%, mp 163° C.) and 20% of ethylene-propylene rubber (26% propylene content); and a commercially available heat insulating copper pipe with an insulating layer of polyethylene with an expansion ratio of 3, a single-layered structure, and $\mu_1/\mu_2=0.45$.

| Thickness of upper-middle-lower layers (mm) | Cell diameter in middle layer (mm) $\mu_1$ | $\mu_2$ | $\mu_1\mu_2$ | Cell diameter in upper and lower layers (mm) |
|---|---|---|---|---|
| Example 7: 0.5-3.0-0.5 | 0.65 | 1.0 | 0.65 | 0.15 |
| Comparative Example 5: 4.0 | 0.60 | 1.3 | 0.45 | — |

The results are shown in Table 3.

TABLE 3

| | Heat insulation | Resistance to compression | Water absorbency | Heat resistance | Buckling |
|---|---|---|---|---|---|
| Present invention (Example 7) | 15 kcal/m·hr | 170 kg | 2.0% | 0.8% | Not noted |
| Prior art (Comparative Example 5) | 22 kcal/m·hr | 120 kg | 5.7% | 6.5% | Noted |

TABLE 3-continued

| | Heat insulation | Resistance to compression | Water absorbency | Heat resistance | Buckling |
|---|---|---|---|---|---|

Note:
(1) Heat insulation: Expressed as the thermal loss (kcal) of a heat insulating pipe per 1 m per 1 hour.
(2) Resistance to compression: A flattening load was exerted by clamping a heat insulating pipe (10 cm × 10 cm) between parallel plates. The load which deformed the pipe from its circular shape was measured.
(3) Water absorbency: The water absorbency is an increased weight % by measured after immersing the heat insulating material in water for 24 hours.
(4) Heat resistance: Shrinkage of the heat insulating material was measured after leaving it in a constant temperature chamber maintained at 120° C. for 22 hours and cooling.
(5) Buckling: Buckling of the foamed heat insulating layer when bent through 90 degrees at 150R.

Thus, the present invention is very advantageous in that a heat insulating pipe with improved heat insulation and strength, smaller water absorbency and excellent heat resistance can be obtained.

Example 8 and Comparative Examples 6 and 7

An azodicarbonamide-based foaming agent (VINYFOR AK#2; EIWA Chemical Co., Japan, 160° C. decomposition temperature) was added in the amount of 2.5 phr to a propylene-ethylene block copolymer (12% ethylene content, MI=0.8). The mixture was fed to a 65 mm screw diameter extruder with a crosshead die. Simultaneously, a copper pipe of 15.88 mm in diameter and a surface temperature of 80° C. was continuously supplied through the crosshead die and coated with the extruded mixture. Immediately after the coated pipe left the die, air at a temperature of 20° C. was blown uniformly on the coated pipe for cooling. A foamed heat insulating layer of 3.5 mm in thickness, a three-layered structure and an expansion ratio of 5.8 was obtained ($\mu_1/\mu_2=0.52$). The die-nipple distance was 0.75 mm, K=0.40. Then the die-nipple distance was varied for comparison. The resultant expansion ratios, layer thicknesses, values of K, and values of $\mu_1/\mu_2$ are shown in the table below.

| | d (mm) | M | t (mm) | K | ($\mu_1/\mu_2$) | Foamed layer |
|---|---|---|---|---|---|---|
| Comparative Example 6 | 0.40 | 8.0 | 1.0 | 0.77 | 0.92 | Not uniform thickness |
| Comparative Example 7 | 1.00 | 3.7 | 8.1 | 0.19 | 0.21 | Cracks |

Example 9 and Comparative Example 8

In Example 8, a polyester-based emulsion coating was applied in advance on the surface of a copper pipe 15.88 mm in outer diameter. After the pipe was heat treated at 220° C. for 30 seconds, it was cooled. While the temperature of the pipe was lowered to 100° C., a foamed layer was coated using the same material as in Example 8. As a result, a foamed layer having an average expansion ratio of 5.8 and a three-layered structure ($\mu_1/\mu_2=0.55$ at the middle layer) was obtained without any problems.

This heat insulating pipe did not show discoloration or degradation of the foamed layer after use over an extended period of time at 110° C.

On the contrary, a copper pipe which was not coated with resin did show yellowing of the foamed heat insulating layer (Comparative Example 8).

Examples 10 and 11, and Comparative Examples 9 and 10

Foaming agents with different decomposition temperatures were prepared by changing the mixing ratios of axodicarbonamide and dinitrosopentamethylenetetramine. Foaming was performed with each foaming agent (2.5 phr) in a manner similar to Example 8. As a result, foamed heat insulating layers as shown below were obtained.

|  | Decomposition temperature of foaming agent | Expansion ratio | Properties of obtained foamed layer |
|---|---|---|---|
| Comparative Example 9 | 182° C. | 2.8 | Single-layered structure bad appearance |
| Comparative Example 10 | 175° C. | 4.1 | Same as above |
| Example 10 | 163° C. | 5.3 | Three-layered structure good appearance |
| Example 11 | 150° C. | 4.8 | Same as above |

What we claim is:

1. A method for manufacturing a heat insulating pipe comprising a pipe having a foamed insulating layer around the outer surface of said pipe, said foamed insulating layer having an expansion ratio of at least 4 and comprising three integrally formed sub-layers, said sub-layers including a cellular middle foamed sub-layer which is integral with a cellular inner foamed sub-layer and a cellular outer foamed sub-layer, said inner and outer sub-layer being on opposite sides of said middle sub-layer, said cellular inner foamed sub-layer being the innermost sub-layer with respect to said pipe and surrounding the outer surface of said pipe,
the cells of said inner and outer cellular sub-layers being smaller than the cells of said middle cellular sub-layer, the ratio $\mu_1/\mu_2$ of the cell dimensions of said cellular middle sub-layer being between 0.3 and 0.9, wherein $\mu_1$ is the average cell dimension measured in the radial direction of said pipe and $\mu_2$ is the average cell dimension measured in the axial direction of said pipe;
the method for producing said 3 sub-layered foamed insulating layer comprising:
passing a pipe heated to a temperature of between 60° C. and 120° C. through the nipple of a cross-head die and simultaneously extruding a mixture of a propylene-ethylene block polymer having an ethylene content of between 1 and 20% by weight and a Melt Index of between 0.1 and 4 together with a foaming agent over the outer surface of said pipe to cause said mixture to expand and form said 3 sub-layered foamed insulating layer on said pipe,
the relationship between the overall thickness t of the 3 sub-layered foamed insulating layer, the expansion ratio M of the 3 sub-layered foamed insulating layer, and the die-nipple distance d of the cross-head die being $$d = K \frac{t}{\sqrt[3]{M}}$$

wherein K=0.75 to 0.20.

2. The method of claim 1 wherein K is 0.3-0.4.

3. The method of claim 1 or 2 wherein said propylene-ethylene block copolymer is a powder having a Melt Index of 0.1-2 and an ethylene content of 7-20%.

4. The method of claim 3 wherein said propylene-ethylene block copolymer has admixed therewith up to 40% by weight of an ethylene-propylene rubber.

5. The method of claim 1 or 2 wherein said propylene-ethylene block copolymer has admixed therewith up to 40% by weight of an ethylene-propylene rubber.

6. The method of claim 1 wherein said foaming agent has a decomposition temperature of between 120° and 170° C.

7. The method of claim 4 wherein said foaming agent has a decomposition temperature of between 120° and 170° C.

8. The method of claim 1 or 2 wherein said pipe is a copper pipe which has been precoated with resin.

9. The method of claim 6 wherein said pipe is a copper pipe which has been precoated with resin applied from an aqueous resin-containing emulsion or an aqueous-containing solution and then baked.

10. The method of claim 1 wherein said middle sub-layer comprises 40-90% of the total thickness of said formed insulated layer.

* * * * *